US009527528B1

(12) United States Patent
Harrison

(10) Patent No.: US 9,527,528 B1
(45) Date of Patent: Dec. 27, 2016

(54) TRAILER RADIUS INDICATION

(71) Applicant: Continental Automotive Systems, Inc., Auburn Hills, MI (US)

(72) Inventor: Christopher Allen Harrison, Shelby Township, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 14/845,787

(22) Filed: Sep. 4, 2015

(51) Int. Cl.
*B62D 6/00* (2006.01)
*H04N 7/00* (2011.01)
*B62D 15/02* (2006.01)
*B60W 30/09* (2012.01)

(52) U.S. Cl.
CPC .......... *B62D 15/0265* (2013.01); *B60W 30/09* (2013.01); *B62D 6/005* (2013.01); *B62D 15/021* (2013.01); *B62D 15/0295* (2013.01); *B60W 2520/10* (2013.01); *B60W 2520/125* (2013.01); *B60W 2520/14* (2013.01)

(58) Field of Classification Search
USPC ............................................ 701/41; 348/118
See application file for complete search history.

(56) References Cited

U.S. PATENT DOCUMENTS

| 7,425,889 B2* | 9/2008 | Widmann | B60R 1/003 340/425.5 |
| 2006/0250225 A1* | 11/2006 | Widmann | B60R 1/003 340/438 |
| 2014/0160276 A1* | 6/2014 | Pliefke | B60R 1/00 348/118 |
| 2014/0172239 A1* | 6/2014 | Vergara | B60Q 1/24 701/49 |
| 2014/0176716 A1* | 6/2014 | Wallat | B62D 15/025 348/148 |

* cited by examiner

*Primary Examiner* — Tyler Paige

(57) ABSTRACT

A method of preventing damage to a vehicle or trailer maneuvering through a forward moving curve. The steps of providing a forward moving vehicle having a vehicle length, a vehicle velocity, a vehicle yaw rate, vehicle lateral acceleration and two or more wheels of the vehicle that cause the vehicle to move or turn around a curve along a current forward path of travel. The method involves determining the current path of the vehicle and determining if the current path is unsafe. Alerting the driver that the current path is unsafe and providing a suggest path to correct the current unsafe path of forward travel.

17 Claims, 5 Drawing Sheets

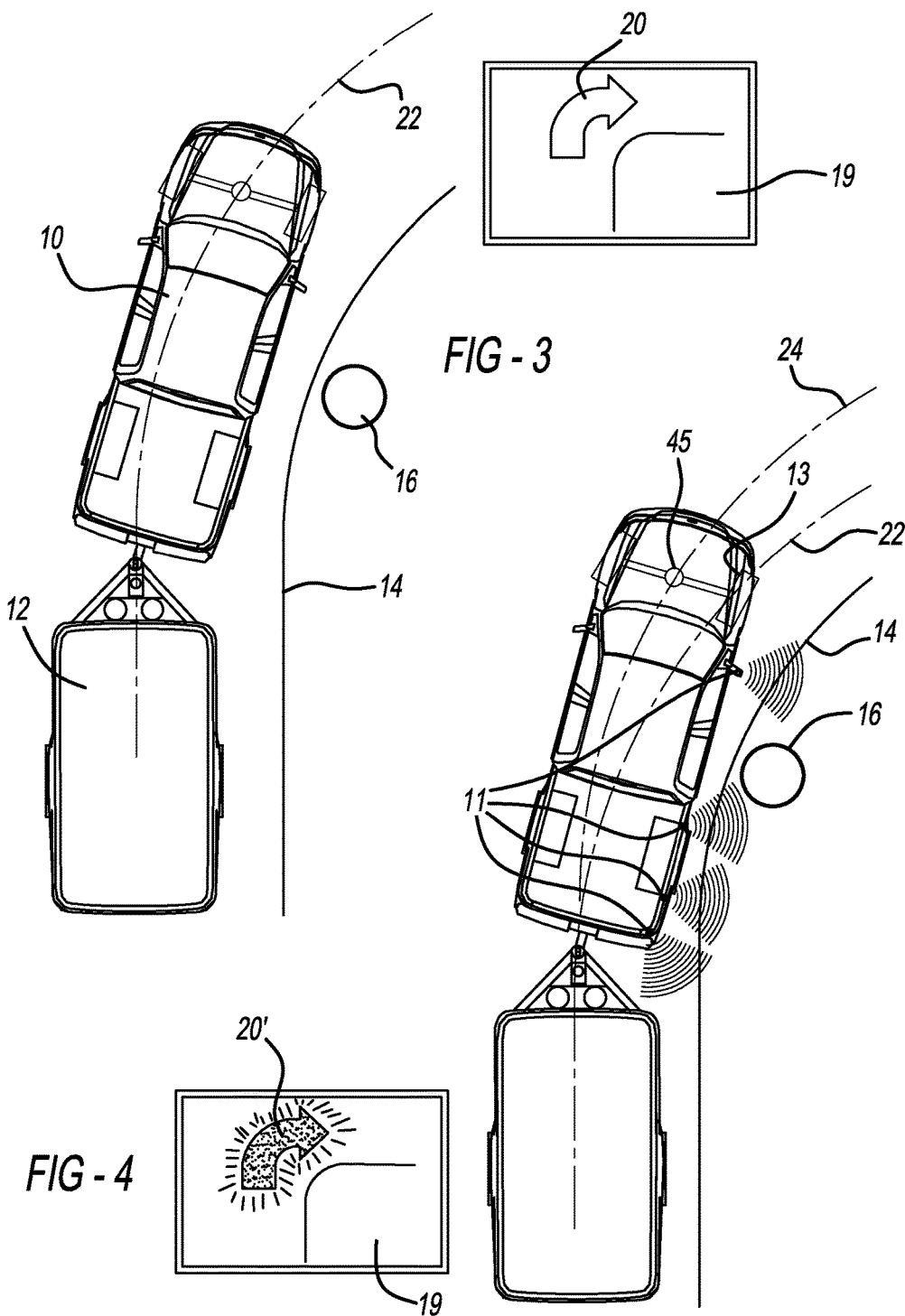

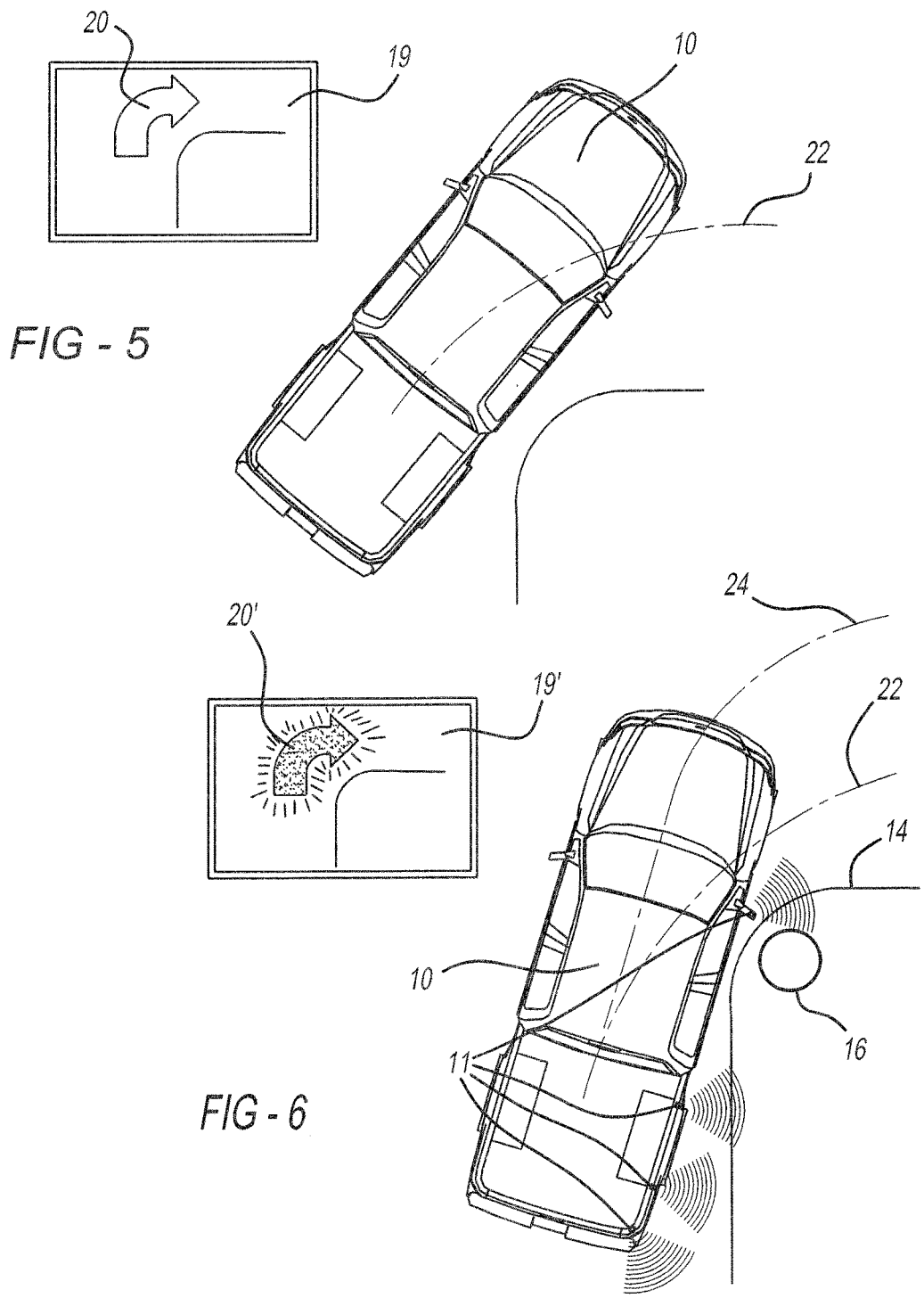

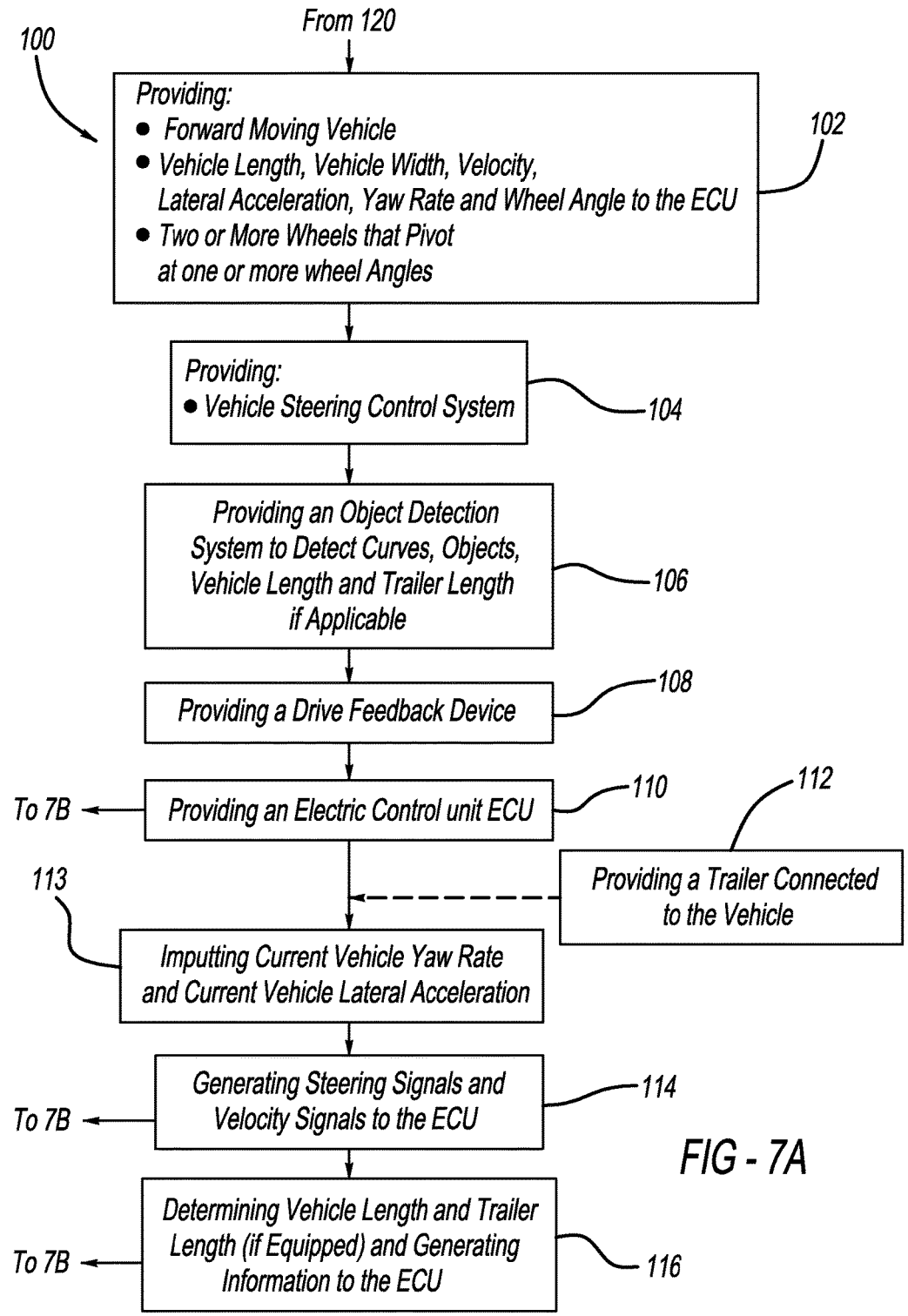

TRAILER RADIUS INDICATION

FIELD OF THE INVENTION

The present invention is a method of preventing damage to a vehicle and trailer during a forward moving turn.

BACKGROUND OF THE INVENTION

There have been many types of inventions relating to trailer and vehicle backup assist methods and equipment. Backup assist methods seek to warn drivers of obstacles when maneuvering a trailer or vehicle in a reverse path. However none of the backup assist methods warn drivers of potential collisions or damage to a trailer being towed behind a vehicle moving in a forward direction. There is a need to assist drivers towing trailers in a forward direction, particularly when maneuvering corners during turns where there is potential for the front of the trailer, trailer wheels or the rear-half of the vehicle to strike an object or curb.

Backup assist methods also help to assist drivers of vehicles when reversing their vehicle in order to warn the drivers of potential hazards. One example is a backup camera with sensors that provide audio warnings when the rear of the vehicle is in danger of colliding with an object. However for vehicles with longer wheelbases, like full-size pickup trucks and sport utility vehicles, there is often a potential for such vehicles to strike an object such as a curb when moving in a forward direction around a turn. There is a need to assist drivers of vehicles moving in a forward direction when maneuvering around corners.

The present invention seeks to address the need for providing warnings to drivers of forward moving vehicles and vehicles towing trailers when turning a corner in a manner that is considered "too sharp" or "too tight" for the turn or corner meaning that the forward moving path of the vehicle or trailer will strike an object or curb during a turn.

SUMMARY OF THE INVENTION

The present invention relates to a method of preventing damage to a vehicle or trailer maneuvering through a forward moving curve. The inputs needed to provide the path of a forward moving vehicle are a vehicle length, a vehicle width, a vehicle velocity, a lateral acceleration, a yaw rate, a wheel angle where two or more wheels of the vehicle cause the vehicle to move or turn around a curve along a current forward path of travel and could optionally include the direct input of trailer characteristics. The vehicle also includes a vehicle steering control system for controlling the pivot of the two or more wheels to the one or more wheel angles. The steering control system can be an electronically controlled steering input or a hydraulically controlled steering input by the driver. An object detection system located on the vehicle detects objects external to the vehicle. Additionally there is a driver feedback device provided on the vehicle. The method further includes providing an electronic control unit (ECU) in the vehicle for receiving inputs from the vehicle steering control system, vehicle velocity data, the object detection system and then sending signals to the driver feedback device.

In another embodiment of the invention where a trailer is towed behind the vehicle, the method includes the step of providing a trailer having a trailer length, where the trailer is connected at a pivot point behind the vehicle. The trailer length, pivot point and current forward path of travel of the vehicle define at least one turn radius of the trailer.

The method involves the steps of generating steering signals from the vehicle steering control system to the ECU where the steering signals are indicative of the current wheel angle of all steered wheels of the vehicle and the steering signals control the one or more wheel angles of the vehicle. Also the method includes generating velocity signals from the one or more velocity sensors to the ECU and generating object detection signals to the ECU indicating the presence and location of a curve or object adjacent the vehicle. The method further includes generating signals from sensors to the ECU in order to determine current vehicle yaw rate and current vehicle lateral acceleration.

The next step includes inputting vehicle length data and trailer length data into the ECU. The trailer length data is provided by the driver or by the object detection system that is capable of determining the length of the trailer being towed behind the vehicle and then sending trailer length signals to the ECU. The vehicle length data can be inputted manually, or automatically be programmed into the ECU based on manufacture preferences because generally the length of the unmodified vehicle is known at the time of manufacture. Additionally it is within the scope of the invention for the vehicle length to also be provided by the object detection system that is capable of determining the vehicle length based on known manufacture settings plus any additional length detected by the object detection system, which is caused by items being attached to the vehicle. Examples of items being connected to the vehicle include cargo hauling platforms, brush guards, push bars, winches, light bars, etc.

Next the step of calculating the current forward path of the vehicle with the trailer towed behind the vehicle is calculated based on the vehicle wheelbase, length, velocity, yaw rate, lateral acceleration and the steering signals. The ECU then determines whether the current forward path of travel is a safe path or unsafe path by evaluating the current forward path of travel, object detection signals, vehicle length and trailer length. The current wheel angle, current vehicle velocity, current vehicle yaw rate and vehicle lateral acceleration measurements are snapshot signals and are variables that can continuously change as the vehicle moves forward. Therefore it is understood that calculations made regarding the current forward moving path of the vehicle is a projected path extrapolated from one or more continuous measurements of current wheel angle, current vehicle velocity, and current vehicle yaw rate and vehicle lateral acceleration measurements since the current path is a determination based on current vehicle position and the future location of the vehicle when the vehicle moves forward based on the current measurements. An unsafe path is determined when the path of travel will cause the vehicle or trailer being towed behind the vehicle to collide with one or more objects detected by the object detection system. A safe path of travel is determined when the vehicle and the trailer being towed behind the vehicle will not collide with one or more objects detected by the object detection system. If an unsafe path is detected, the ECU will send a warning signal to the driver feedback device. The driver feedback device will activate in order to convey that an unsafe path of travel has been determined.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 3 is an overhead schematic view of a vehicle towing a trailer turning around a corner along a safe path of travel with the turn indicator screen signaling that the vehicle and trailer is travelling along a safe path;

FIG. 4 is an overhead schematic view of a vehicle towing a trailer turning around a corner along an unsafe path of travel with the turn indicator screen signaling that the vehicle and trailer is travelling along an unsafe path;

FIG. 5 is an overhead schematic view of a vehicle turning around a corner along a safe path of travel with the indicator signaling that the vehicle is traveling along a safe path;

FIG. 6 is an overhead schematic view of the vehicle turning around a corner along an unsafe path of travel with the indicator signaling that the vehicle is traveling along an unsafe path;

FIG. 7A is a flow diagram illustrating the steps of the method in accordance with the present invention.

DETAILED DESCRIPTION OF THE PREFERRED EMBODIMENTS

Figure 1:
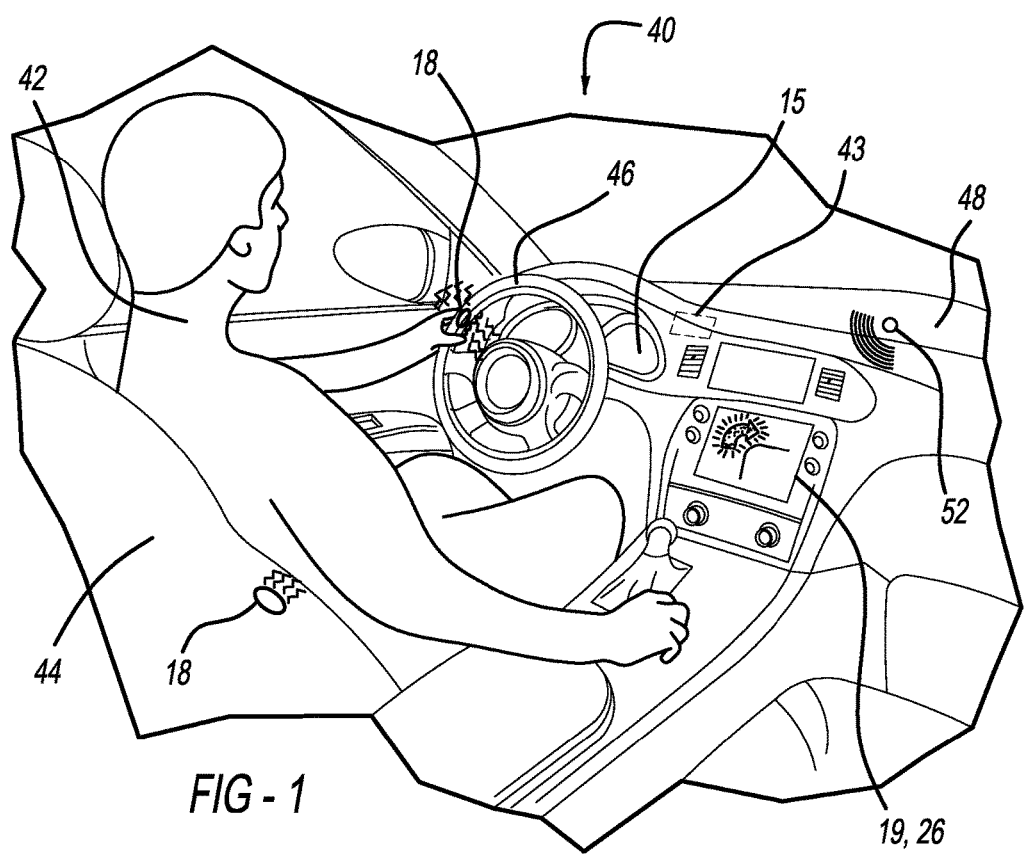
FIG. 1 is a perspective of environmental view of an interior cabin of the vehicle with a turn indicator screen.

Referring now to FIGS. 3-6 a method of preventing damage to a vehicle towing a trailer, shown in FIGS. 3 and 4 or a vehicle by itself as shown in FIGS. 5 and 6, in both cases the vehicle and trailer are driving in a forward moving curve as shown and described. In FIGS. 3-6 a vehicle 10 has a length, width velocity, yaw rate and lateral acceleration. The velocity, yaw rate, and lateral acceleration of the vehicle is determined using one or more sensors 15 that can be speed sensors, accelerometers, and inputs from the electronic stability control system. The length of the vehicle, which can include articles attached to the vehicle such as a trailer 12 (shown in FIGS. 3 and 4) can be determined using an object detection system 11 located on the vehicle 10. The object detection system 11 is also used to detect the presence of a curve 14 as well as objects 16 around the vehicle 10 or trailer 12. The object detection system 11 can be many types of sensors, including but not limited to ultrasonic sensors mounted to the side of the vehicle, headlight of the vehicle, side view mirrors or taillight of the vehicle in order to provide or sense objects forward, rearward and sideways from the vehicle 10. The vehicle 10 has two or more wheels 13 that are connected to a vehicle steering control system that causes the two or more wheels 13 to pivot at one or more wheel angles to cause the vehicle 10 and trailer 12 (if present) to move or turn around a curve 14.

FIG. 3 shows the vehicle 10 and trailer 12 moving forward through the curve 14 along a safe path. Also shown is a driver feedback device 18, which in the present embodiment of the invention is a visual display screen 19, schematically shown and having an arrow 20 that is not illuminated, to thereby indicate that the vehicle 10 and trailer 12 are traveling along a safe path and will not strike the curve 14 or object 16.

FIG. 4 depicts the vehicle 10 and trailer 12 moving forward through the curve 14 along an unsafe path. As shown the vehicle 10 or trailer 12 will strike the curve 14 or object 16 if the vehicle 10 and trailer 12 do not change course. The visual display screen 19 of the driver feedback device 18 conveys that the vehicle 10 and trailer 12 are traveling along an unsafe path by illuminating the arrow 20'.

In FIGS. 3-6 the display screen 19 and arrow 20, 20' are shown in schematic form in order to better illustrate the possible visual displays that can be shown on a screen inside of the vehicle. It is possible for the display screen 19 to be an illuminated graphic located in the driver instrumentation area or Heads Up Display (HUD). It is also within the scope of this invention for a screen to show the schematic diagrams as shown in FIGS. 3-6 on a much larger display screen where an overhead view of the vehicle 10 or the vehicle and trailer 12 are shown with a current forward path of travel 22 line shown on the screen, alongside a suggested path of travel 24 line, in order to give the driver an idea of how much to adjust the wheel angles of the vehicle 10. As the driver turns the steering wheel the current path of travel line 22 can move or be adjusted on the screen to show the driver how much more correction is required or how much the driver can still turn without having an unsafe condition.

Figure 2:
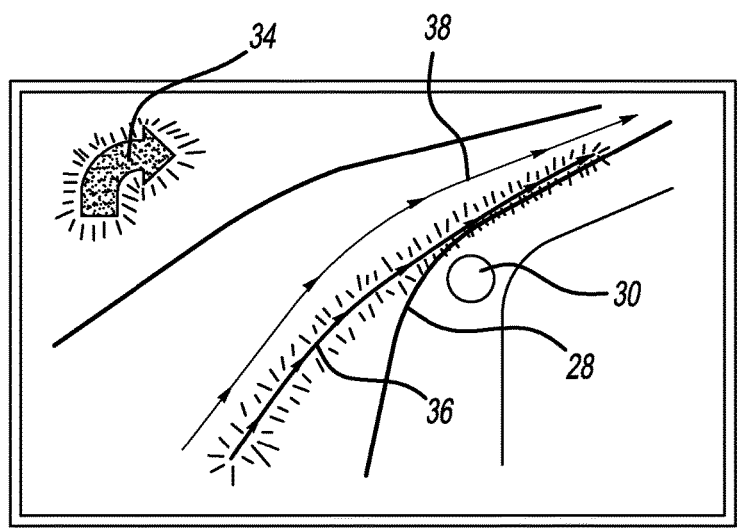
FIG. 2 is an example of a turn screen in accordance with the present invention.

Referring to FIG. 2 another embodiment of the invention is shown having a three dimensional display 26 that shows the curve 28 objects 30 and the roadway 32. Additionally the three dimensional display 26 has an arrow 34 indicator that can be illuminated in order to indicate that the vehicle or vehicle and trailer is traveling on an unsafe path of travel through the curve 28. The three dimensional display 26 can have a current path of travel line 36 and a suggested path of travel 38 line when an unsafe path has been determined. The three dimensional display 26 will also allow the current path of travel 36 line to move as the driver turns the steering wheel in order to make the appropriate correction to the vehicle steering in order to avoid a collision with the curve 28 or objects 30.

Referring now to FIG. 1 a perspective view of a vehicle interior 40 of the vehicle 12 (shown in FIGS. 3-6) is shown. The vehicle interior 40 has a driver 42 operating the vehicle while seated in a seat 44 and moving a steering wheel 46. The vehicle interior 40 also includes various depictions of the driver feedback device 18. The driver feedback device 18 can take many different forms, as shown in FIG. 1. For example in FIG. 1 the driver feedback device 18, in one embodiment is the display screen 19, which is described above with respect to FIGS. 3-6; or the three dimensional display 26, which is described above with respect to FIG. 2. The display screen 19 or three dimensional display 26 shown in FIG. 1 can also be a driver interface when the vehicle 10 is not in motion. The driver interface allows for the driver 42 to input data such as vehicle length or trailer length data to the ECU 43 which is then used to perform or calculate the path of vehicle 10 or vehicle 10 and trailer 12 in relation to a curve 28 or objects 30. As described above if the display screen 19 or the three dimensional display 26 includes a current path 22, 36 lines, when the driver 42 turns the steering wheel 46 the current path of travel will change on the respective display screen 19 or three dimensional display 26.

In another embodiment of the invention, the driver feedback device 18 is one or more haptic feedback devices that can be a haptic device 50 that vibrates in the seat 44 where the driver 42 sits or virtually any other location, including a haptic device 50' in the steering wheel 46. The haptic devices 50, 50' are used either alone or in combination with the display screen 19 or three dimensional display 26. In another embodiment of the invention the driver feedback device 18 is an audio alarm 52 used either alone or in combination with the haptic devices 50, 50', the display screen 19 or the three dimensional display 26. The audio alarm 52 can make virtually any type of sound including a chime or beep sound that will be heard by the driver 42.

Figure 7B:
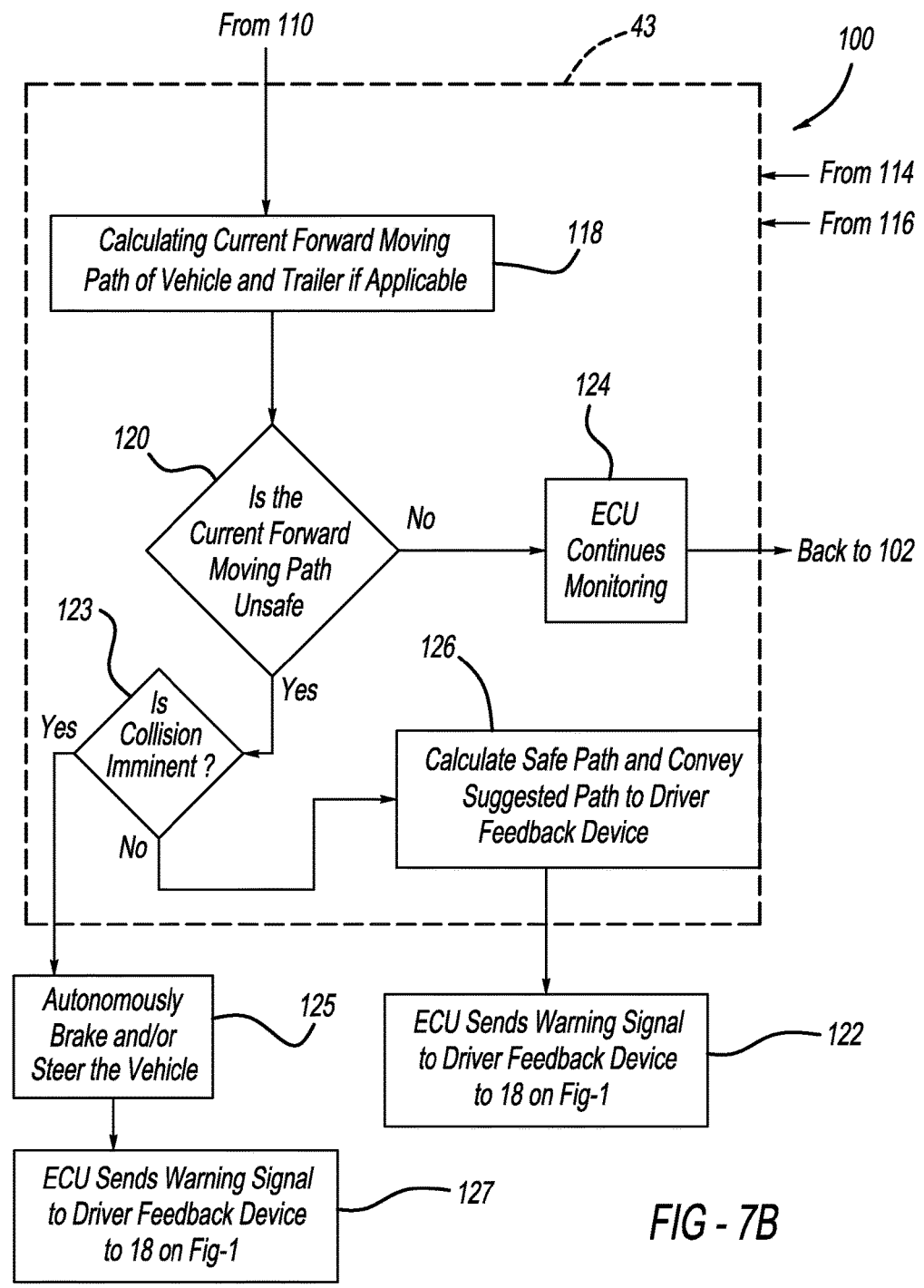
FIG. 7B is a flow diagram illustrating the steps of the method in accordance with the present invention.

FIG. 7 depicts a flow chart outlining a method 100 of preventing damage to a vehicle or trailer during a forward moving curve. The method 100 is carried out on the vehicle 10, which is schematically shown as a dashed line box on FIG. 7. At step 102 the method 100 includes providing a forward moving vehicle having a vehicle length, a vehicle velocity, which are provided to an electronic control unit on the vehicle 10. The vehicle length is a known variable that is programmed into the ECU 43 based on vehicle manufacturer specifications. However it is also within the scope of this invention for the vehicle width and length to be determined using sensors, particularly in cases where items or articles are being attached to a vehicle, adding to the length and width of the vehicle 10. Additionally the step 102 also includes providing two or more wheels that pivot at one or more wheel angles to cause the vehicle 10 to move or turn around a curve along the current forward path of travel 22, 36.

At a step 104 the method provides the vehicle steering control system 45 including the steering wheel 46 that controls the pivot of the two or more wheels 13 to the one or more wheel angles. As described above the vehicle steering control system 45 is controlled by driver steering wheel inputs from the driver 42 when he or she turns the steering wheel 46 to various locations, which in turn causes the vehicle steering control system 45 to pivot the two or more wheels 13 of the vehicle 10 to pivot to one or more wheel angles. The driver steering wheel inputs are received in the method 100 at step 104. At a step 106 the method includes providing the object detection system 11 on the vehicle 10 that is capable of detecting objects external to the vehicle 10. The objects that are detected can include the curb 14 as well as objects 16 as described above. At a step 108 the method also includes providing the driver feedback device 18 as discussed with respect to FIG. 1.

Next at a step 110 the method includes providing the electronic control unit that is also discussed above with respect to FIG. 1, which is contained in the vehicle 10 and receives inputs from the vehicle steering control system 45, the object detection system 11 as well as sending signals to the driver feedback device 18 or devices if there are multiple present.

Step 112 is an alternate step that includes providing the trailer 12 connected to the vehicle 10 at a pivot point, where the trailer length, pivot point in current forward path of travel of the vehicle define the turn radius of the trailer, which is calculated by the ECU 43. Step 112 is an alternate step because the method 100 can be accomplished for a vehicle 10 not towing a trailer 12 is shown in FIGS. 5 and 6, or a vehicle 10 towing a trailer 12 as shown in FIGS. 3 and 4.

At a step 114 steering signals from the vehicle steering control system 45 are generated to the ECU 43, which define the one or more wheel angles of the two or more wheels 13. Also during step 114 the velocity signals are inputted to the ECU 43 from the one or more velocity sensors 15 on the vehicle 10.

At step 116 the vehicle length data and trailer length data (if applicable) are determined and the information is generated to the ECU 43. The trailer length data is provided by the driver 42 using an interface to the ECU 43 or by the object detection system 11 that is capable of sending signals to the ECU 43 that are indicative of the length of the trailer being towed behind the vehicle. The step 116 might be omitted in embodiments where there is no trailer connected to the vehicle and the vehicle length is programmed onto the ECU using known vehicle length at the time of manufacture. Also the vehicle length if no trailer is being towed can be calculated using signals from the object detection system 11, where the vehicle length is different from the length of the vehicle at the time of manufacture. For example if a platform is connected to the rear or front of the vehicle, the vehicle length might actually be longer than the length at the time of manufacture.

At a step 118 the ECU 43 calculates the current forward path of travel of the vehicle 10, alone or with the trailer 12 towed behind the vehicle 10 based on the vehicle width, velocity and steering signals provided in the steps above. At a step 120 the ECU 43 determines whether the current forward path of travel is unsafe path by evaluating the current forward path of travel, object detection signals, vehicle length and trailer length (if trailer is being towed). If unsafe path is determined when the current forward path of travel will cause the vehicle 10 or trailer 12 being towed behind the vehicle to collide with a curb 14 or one or more objects 16 detected by the object detection system. A safe path of travel is determined when the vehicle and trailer being towed behind the vehicle will not collide with one or more objects or a curb detected by the object detection system.

If at a step 120 an unsafe path has been determined then at step 123 a decision will be made whether collision is imminent. If a collision is imminent then at step 125 the ECU 42 will send a signal that autonomously brakes and or steers the vehicle 10 to avoid the collision and the ECU at step 127 sends a warning signal to the driver feedback device 18 on FIG.—1. If at step 123 it is determined that a collision is not imminent then at step 122 the ECU 43 will send a warning signal to the driver feedback device 18 in order to activate the driver feedback device 18 to convey to the driver to that an unsafe path of travel has been determined. If at step 122 a decision is made that a safe path of travel has been detected then at a step 124 the ECU 43 will continue to monitor for signals from the object detection system 11, at which time the method 100 will be rerun.

At a step 126 if an unsafe path of travel has been determined the ECU 43 can be used to calculate a safe path of travel and then convey the suggested safe path to the driver 42 using the driver feedback device in the manners described above with respect to FIGS. 1-6 or by automatically steering the vehicle by sending commands to the steering ECU.

The calculation of the current forward path of travel as well as a suggested path of travel can be accomplished using many different formulas. One example formula is $Fy=MV^2/R$; where Fy is cornering force, M is mass of vehicle V is velocity and R is radius. This formula can be used to calculate the current path of travel of the vehicle and vehicle towing a trailer if applicable. Then using additional information regarding vehicle length or trailer length a suggested path of travel can be calculated using the above equation and determining the difference between the calculated path of the current path of travel and the suggested path of travel.

The invention described herein is merely exemplary in nature and, thus, variations that do not depart from the gist of the invention are intended to be within the scope of the invention. Such variations are not to be regarded as a departure from the spirit and scope of the invention.

What is claimed is:

1. A method of preventing damage to a vehicle during a forward moving curve comprising the steps of:

providing a forward moving vehicle having a vehicle length, a vehicle width; a vehicle velocity, a current vehicle yaw rate, a current vehicle lateral acceleration and two or more wheels wherein at least one of the two or more wheels pivot to one or more wheel angles to cause the vehicle to move or turn around a curve along a current forward path of travel;

providing a vehicle steering control system on the vehicle for controlling the pivot of the two or more wheels to said one or more wheel angles;

providing one or more velocity sensors for communicating velocity signals indicative of the speed of the vehicle;

providing an object detection system on the vehicle capable of sending object detection signals;

providing a driver feedback device on the vehicle;

providing an electronic control unit (ECU) in the vehicle for receiving inputs from the vehicle steering control system, vehicle velocity sensors, the object detection system and sending signals to the driver feedback device;

generating steering signals from the vehicle steering control system to the ECU, wherein the steering signals control the one or more wheel angles;

inputting current vehicle yaw rate and current vehicle lateral acceleration to the ECU;

generating the object detection signals from the objected detection system to the ECU;

generating the velocity signals from the one or more velocity sensors to the ECU;

inputting the vehicle length and vehicle width data to the ECU, wherein the vehicle length data and the vehicle width data is provided by the driver or by the exterior object detection system that is capable of determining the length of the vehicle;

calculating the current forward path of travel of the vehicle based on the vehicle length, the vehicle width, the vehicle velocity, the current vehicle yaw rate, the current vehicle lateral acceleration and the steering signals indicative of the one or more wheel angles;

determining, using the ECU whether the current forward path of travel is a safe path or unsafe path by evaluating the current forward path of travel, object detection signals and vehicle length, wherein an unsafe path is determined when the path of travel will cause the vehicle to collide with the one or more objects detected by the object detection system and a safe path of travel is determined when the vehicle will not collide with one or more objects detected by the object detection system;

sending a warning signal to the driver feedback device when an unsafe path of travel has been determined by the ECU, wherein the driver feedback device will activate in order to convey that an unsafe path has been determined by the ECU;

using the ECU to calculate a suggested safe path; and conveying the suggested safe path to the driver using a visual display screen with an unsafe path graphic showing the unsafe path and a suggested safe path graphic showing the safe path on the visual display screen to allow for the driver to determine how much of an adjustment should be made to the one or more wheel angles of the two or more wheels in order to adjust the current forward path travel to the suggested safe path.

2. The method of claim 1 wherein the unsafe path graphics will move as the driver changes the one or more wheel angles.

3. The method of claim 1 wherein the visual display screen shows an overhead schematic view of the vehicle showing the suggested safe path graphics and the unsafe path graphics.

4. The method of claim 1 wherein the visual display screen shows a video taken from a forward camera on the vehicle, wherein the suggested safe path graphics and the unsafe path graphics are shown on the video on the visual display screen.

5. The method of claim 1 wherein the driver feedback device is one or more selected from the group consisting of an audible warning, a haptic feedback device in a driver seat, a haptic feedback device in a steering wheel, a visual display screen showing an image taken by a forward view camera mounted to the rear of the vehicle, and an overhead vehicle diagram schematically showing the vehicle from a top view.

6. The method of claim 1 further comprising the step of confirming the vehicle length, wherein the vehicle length includes the known length of the vehicle as manufactured plus any objects attached to the vehicle determined using a vehicle mounted camera or ultrasonic sensors connected to the vehicle.

7. A method of preventing damage to a vehicle during a forward moving curve comprising the steps of:

providing a forward moving vehicle having a vehicle length, a vehicle width; a vehicle velocity, a current vehicle yaw rate, a current vehicle lateral acceleration and two or more wheels wherein at least one of the two or more wheels pivot to one or more wheel angles to cause the vehicle to move or turn around a curve along a current forward path of travel;

providing a vehicle steering control system on the vehicle for controlling the pivot of the two or more wheels to said one or more wheel angles;

providing one or more velocity sensors for communicating velocity signals indicative of the speed of the vehicle;

providing an object detection system on the vehicle capable of sending object detection signals;

providing a driver feedback device on the vehicle;

providing an electronic control unit (ECU) in the vehicle for receiving inputs from the vehicle steering control system, vehicle velocity sensors, the object detection system and sending signals to the driver feedback device;

generating steering signals from the vehicle steering control system to the ECU, wherein the steering signals control the one or more wheel angles;

inputting current vehicle yaw rate and current vehicle lateral acceleration to the ECU;

generating the object detection signals from the objected detection system to the ECU;

generating the velocity signals from the one or more velocity sensors to the ECU;

inputting the vehicle length and vehicle width data to the ECU, wherein the vehicle length data and the vehicle width data is provided by the driver or by the exterior object detection system that is capable of determining the length of the vehicle;

calculating the current forward path of travel of the vehicle based on the vehicle length, the vehicle width, the vehicle velocity, the current vehicle yaw rate, the current vehicle lateral acceleration and the steering signals indicative of the one or more wheel angles;

determining, using the ECU whether the current forward path of travel is a safe path or unsafe path by evaluating the current forward path of travel, object detection signals and vehicle length, wherein an unsafe path is determined when the path of travel will cause the vehicle to collide with the one or more objects detected by the object detection system and a safe path of travel is determined when the vehicle will not collide with one or more objects detected by the object detection system;

sending a warning signal to the driver feedback device when an unsafe path of travel has been determined by the ECU, wherein the driver feedback device will activate in order to convey that an unsafe path has been determined by the ECU; and determining if a collision is imminent and activating automatic braking if a collision is determined to be imminent.

8. A method of preventing damage to a vehicle or trailer during a forward moving curve comprising the steps of:

providing a forward moving vehicle having a vehicle length, a vehicle width, a vehicle velocity, a current vehicle yaw rate, a current vehicle lateral acceleration, and two or more wheels wherein at least one of the two or more wheels pivot to one or more wheel angles to cause the vehicle to move or turn around a curve along a current forward path of travel;

providing a vehicle steering control system on the vehicle for controlling the pivot of the two or more wheels to said one or more wheel angles;

providing one more velocity sensors for communicating velocity signals indicative of vehicle speed;

providing an object detection system on the vehicle that detects objects external to the vehicle;

providing a driver feedback device on the vehicle;

providing an electronic control unit (ECU) in the vehicle for receiving inputs from the vehicle steering control system and the object detection system and sending signals to the driver feedback device;

providing a trailer having a trailer length, wherein said trailer is towed behind the vehicle and connected at a pivot point, wherein the trailer length, pivot point and the current forward path of travel of the vehicle define at least one turn radius of the trailer;

generating steering signals from the vehicle steering control system to the ECU, wherein the steering signals control one or more wheel angles;

inputting the current vehicle yaw rate and the current vehicle lateral acceleration to the ECU;

generating the velocity signals from the one or more velocity sensors to the ECU;

generating the object detection signals from the objected detection system to the ECU;

inputting the vehicle length data and trailer length the data into the ECU, wherein the trailer length data is provided by the driver or by the object detection system that is capable of determining the length of the trailer being towed behind the vehicle and sending trailer length signals to the ECU;

calculating the current forward path of travel of the vehicle with the trailer towed behind the vehicle based on the vehicle length, the vehicle width, the vehicle velocity, the current vehicle yaw rate, the current vehicle lateral acceleration and the steering signals indicative of the one or more wheel angles;

determining, using the ECU, whether the current forward path of travel is a safe path or unsafe path by the evaluating the current forward path of travel, object detection signals, vehicle length and trailer length, wherein an unsafe path is determined when the path of travel will cause the vehicle or the trailer being towed behind the vehicle to collide with the one or more objects detected by the object detection system and a safe path of travel is determined when the vehicle and the trailer being towed behind the vehicle will not collide with one or more objects detected by the object detection system; and sending a warning signal to the driver feedback device when an unsafe path of travel has been determined by the ECU, wherein the driver feedback device will activate in order to convey that an unsafe path of travel has been determined;

wherein the driver feedback device is one or more selected from the group consisting of an audible warning, a haptic feedback device in a driver seat, a haptic feedback device in a steering wheel, a visual display screen showing an image taken by a forward view camera mounted to the rear of the vehicle, and an overhead vehicle diagram schematically showing the vehicle from a top view.

9. The method of claim 8 further comprising the step of: using the ECU to calculate a suggested safe path; and conveying the suggested safe path to the driver using the driver feedback device.

10. The method of claim 9 wherein the step of conveying the safe path to the driver is accomplished using a visual display screen with an unsafe path graphic showing the unsafe path and a suggested safe path graphic showing the safe path on the visual display screen to allow for the driver to determine how much of an adjustment should be made to the one or more wheel angles of the two or more wheels in order to adjust the current forward path travel to the suggested safe path.

11. The method of claim 10 wherein the unsafe path graphics will move as the driver changes the one or more wheel angles.

12. The method of claim 10 wherein the visual display screen shows an overhead schematic view of the vehicle showing the suggested safe path graphics and the unsafe path graphics.

13. The method of claim 10 wherein the visual display screen shows a video taken from a forward camera on the vehicle, wherein the suggested safe path graphics and the unsafe path graphics are shown on the video on the visual display screen.

14. The method of claim 8 further comprising the step of confirming the vehicle length, wherein the vehicle length includes the known length of the vehicle as manufactured plus any objects attached to the vehicle determined using a vehicle mounted camera or ultrasonic sensors connected to the vehicle.

15. The method of claim 8 further comprising the steps of: wherein the object detection system includes one or more selected from the group consisting of ultrasonic sensors and cameras and determining the trailer length using a vehicle mounted camera or ultrasonic sensors connected to the vehicle.

16. The method of claim 8 further comprising the steps of: determining if a collision is imminent and activating automatic braking if a collision is determined to be imminent.

17. The method of claim 8 further comprising the step of inputting the trailer length into the ECU by driver inputs using an ECU interface.

\* \* \* \* \*